US011193440B2

(12) United States Patent
Hishida et al.

(10) Patent No.: US 11,193,440 B2
(45) Date of Patent: *Dec. 7, 2021

(54) MISFIRE DETECTING DEVICE FOR INTERNAL COMBUSTION ENGINE

(71) Applicant: TOYOTA JIDOSHA KABUSHIKI KAISHA, Toyota (JP)

(72) Inventors: Takuya Hishida, Aichi-gun (JP); Toshikazu Kato, Toyota (JP); Hayato Imai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,644

(22) Filed: Dec. 4, 2020

(65) Prior Publication Data

US 2021/0087991 A1 Mar. 25, 2021

Related U.S. Application Data

(63) Continuation of application No. 16/272,120, filed on Feb. 11, 2019, now Pat. No. 10,934,959.

(30) Foreign Application Priority Data

Apr. 11, 2018 (JP) .............................. JP2018-076394

(51) Int. Cl.
 *F02D 41/14* (2006.01)
 *G01M 15/11* (2006.01)
 *F02D 41/22* (2006.01)
(52) U.S. Cl.
 CPC ......... *F02D 41/1498* (2013.01); *G01M 15/11* (2013.01); *F02D 41/22* (2013.01); *F02D 2200/1015* (2013.01)

(58) Field of Classification Search
 CPC ....... F02D 2041/228; F02D 2200/0812; F02D 2200/1015; F02D 41/029; F02D 41/1498; F02D 41/22; F02D 41/2403; G01M 15/11
 See application file for complete search history.

(56) References Cited

U.S. PATENT DOCUMENTS 6,338,326 B1 1/2002 Ebeling et al.
9,068,522 B2 * 6/2015 McConville ........ F02D 41/1454
(Continued)

FOREIGN PATENT DOCUMENTS

| JP | H5-202799 A | 8/1993 |
| JP | 2006-342768 A | 12/2006 |
| JP | 2014-185562 A | 10/2014 |

OTHER PUBLICATIONS

JP 05-202799 Takaku et al machine translation (Year: 1993).*
Jun. 23, 2020 Office Action Issued in U.S. Appl. No. 16/272,120.

*Primary Examiner* — Carl C Staubach
(74) *Attorney, Agent, or Firm* — Oliff PLC

(57) ABSTRACT

The occurrence of the misfire having a level at which exhaust purifying function of a catalyst is impaired (OT-level misfire) is detected. Upon the detection of the OT-level misfire, basic OT risk from the misfire is multiplied by a correction coefficient corresponding to the accumulated PM amount on the catalyst. The basic OT risk from the misfire is a basic value of OT risk from the misfire which is set based on the operating condition of the engine. The correction coefficient is set to a smaller value as the accumulated PM amount increases. Therefore, the OT risk from the misfire after the multiplication decreases as the accumulated PM amount increases. When a predetermined judgement condition with the OT risk from the misfire is established, it is judged that the misfire having the level occurs.

3 Claims, 5 Drawing Sheets

(56) References Cited

U.S. PATENT DOCUMENTS

| | | | |
|---|---|---|---|
| 10,934,959 B2* | 3/2021 | Hishida | F02D 41/029 |
| 2016/0251995 A1 | 9/2016 | Tsunooka et al. | |
| 2016/0265452 A1 | 9/2016 | Martin et al. | |
| 2018/0334976 A1* | 11/2018 | Sudschajew | F02D 41/027 |

* cited by examiner

MISFIRE DETECTING DEVICE FOR INTERNAL COMBUSTION ENGINE

CROSS-REFERENCE TO RELATED APPLICATION(S)

This application is a continuation of U.S. patent application Ser. No. 16/272,120, filed on Feb. 11, 2019, entitled "MISFIRE DETECTING DEVICE FOR INTERNAL COMBUSTION ENGINE", which claims priority to Japanese Patent Application No. JP 2018-076394, filed on Apr. 11, 2018. All of the prior applications are hereby incorporated by reference in their entirety for all purposes.

TECHNICAL FIELD

The present disclosure relates to a misfire detecting device of an internal combustion engine.

BACKGROUND

JPH05-202799A discloses a misfire detecting device which is configured to evaluate, based on an operating condition of an internal combustion engine, damage of an exhaust purifying device caused by occurrence of misfire. The conventional device calculates an assessment value when the misfire occurs during an assessment period. The assessment value is calculated in association with the operating condition at the occurrence of the misfire. In addition, the conventional device integrates the assessment value calculated during the assessment period, and if the integrated value is greater than or equal to a threshold, it judges that the misfire goes beyond a level at which function of an exhaust purifying device of the engine is impaired.

However, the conventional device does not consider a case where the exhaust purifying device is constituted by a filter (e.g., a filter having a honeycomb structure). In this case, PM (Particulate Matters) accumulated on the filter has a great influence on the above judgement processing. This is because that when PM accumulate on the filter, fuel in unburned state which flows into the filter at the misfire induces the combustion of the accumulated PM, thereby exhaust temperature increased drastically. Therefore, there is a possibility that the conventional device is unable to detect the occurrence of the misfire having a level at which the exhaust purifying function of the filter is impaired.

The present disclosure addresses the above described problem, and an object of the present disclosure is, to provide a misfire detecting device of an internal combustion engine that is able to increase an accuracy in detecting the occurrence of misfire having the level at which the exhaust purifying function of the filter is impaired.

SUMMARY

A first aspect of the present disclosure is a misfire detecting device of an internal combustion engine for solving the problem described above and has the following features.

The misfire detecting device comprises a filter for exhaust purification of the internal combustion engine and a control unit.

The control unit is configured to:

estimate an amount of particulate matters accumulated on a filter for exhaust purification of an internal combustion engine;

set a misfire judgement value based on an operating condition of the internal combustion engine and the accumulated amount of the particulate matters;

when a predetermined judgement condition with the misfire judgement value is established, judge that a misfire having a level at which exhaust purifying function of the filter is impaired occurs; and when it is judged that the misfire occurs, notify that an abnormality has occurred in the internal combustion engine.

The control unit is further configured to set the misfire judgement value to a smaller value as the accumulated amount increases.

A second aspect of the present disclosure has the following features according to the first aspect.

The control unit is further configured to:

set a basic misfire judgment value based on the operating condition;

set a correction coefficient based on the accumulated amount; and set the misfire judgement value by multiplying the basic misfire judgment value by the correction coefficient.

The correction coefficient is set to a smaller value as the accumulated amount increases.

A third aspect of the present disclosure has the following features according to the first aspect.

The internal combustion engine is a spark ignition type engine equipped with an injector which is configured to inject fuel directly into a cylinder.

According to the first aspect, the more the accumulated amount of the particulate matters (i.e., the PM), the smaller the misfire judgment value is set. When the misfire judgment value is set to a smaller value, it is possible to suppress false detection that the misfire has not occurred, despite the occurrence of a misfire having a level at which the exhaust purification function of the filter is impaired by the combustion of the PM accumulated thereon. In other words, it is possible to increase the accuracy in detecting the occurrence of the misfire having the level at which the exhaust purifying function of the filter is impaired.

According to the second aspect, the correction coefficient is set to a smaller value as the accumulated PM amount increases. Therefore, it is possible to set the misfire judgement value, which is set by multiplying the basic misfire judgment value by the correction coefficient, to a smaller value as the accumulated PM amount increases.

In recent years, a small displacement and a high compression ratio are required for a spark ignition type engine. When fuel is directly injected into a cylinder of such the engine, the PM is easily discharged as compared with a case where fuel is injected into an intake port of the engine. In this respect, according to the third aspect, even if the filter is applied to the spark ignition type engine equipped with a direct injection injector, it is possible to increase the accuracy in detecting the occurrence of the misfire having the level at which the exhaust purifying function of the filter is impaired.

DESCRIPTION OF EMBODIMENT

Figure 1:
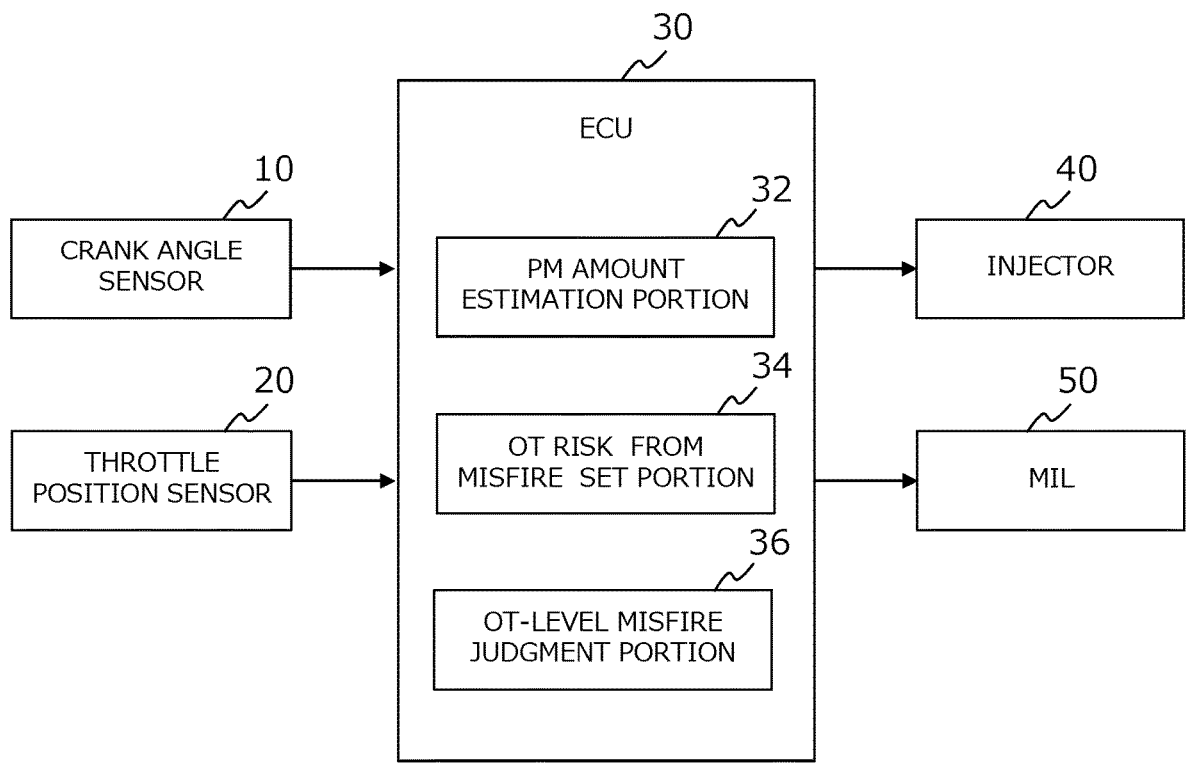
FIG. 1 is a diagram for describing a configuration example of a misfire detecting device according to an embodiment of present disclosure.

Hereinafter, an embodiment of the present disclosure will be described based on the accompanying drawings. Note that elements that are common to the respective drawings are denoted by the same reference characters and a duplicate description thereof is omitted. Further, the present disclosure is not limited to the embodiment described hereinafter.

1. System Configuration

A misfire detecting device according to the present embodiment is a device for detecting the misfire of the internal combustion engine installed in a vehicle. Specifically, the internal combustion engine is a spark ignition type engine including a plurality of cylinders. The engine includes an exhaust pipe in which a GPF (Gasoline Particulate Filter) is installed. The GPF has a honeycomb structure and collects the PM flowing through the exhaust pipe. The honeycomb structure is consisted of cells on which a catalyst (e.g., a three-way catalyst) for purifying specific components in exhaust is carried. The GPF purifies the exhaust flowing through the exhaust pipe.

FIG. 1 is a diagram for describing a configuration example of the misfire detecting device according to the present embodiment. As shown in FIG. 1, the misfire detecting device includes a crank angle sensor 10, a throttle position sensor 20, an ECU (Electric Control Unit) 30, an injector 40 and a MIL (Malfunction Indicator Light) 50.

The crank angle sensor 10 is a sensor for detecting rotation angle of a crankshaft of the engine. The crank angle sensor 10 transmits information of the detected rotation angle (hereinafter also referred to as "information on crank angle") to the ECU 30.

The throttle position sensor 20 is a sensor for detecting opening degree of a throttle valve of the engine. The throttle position sensor 20 transmits information on the detected opening degree (hereinafter also referred to as "information on throttle position") to the ECU 30.

The ECU 30 is a microcomputer including a processor, a memory, and an input and output interface. The ECU 30 receives various information via the input and output interface. Based on the received various information, the ECU 30 executes misfire judgment processing of the engine.

The injector 40 is provided in each cylinder of the engine. The injector 40 directly injects fuel into the cylinder in accordance with a command from the ECU 30. In other words, the internal combustion engine to which the misfire detecting device according to the present embodiment is applied is also a direct injection type engine.

The MIL 50 is attached to a car instrument panel of the vehicle. The MIL 50 is turned on in accordance with an instruction from the ECU 30.

2. Function of ECU

As function for executing misfire judgment processing of the engine, the ECU 30 includes a PM amount estimation portion 32, an OT (Over Temperature) risk from the misfire set portion 34, and an OT-level misfire judgment portion 36. The functional configuration will be described below.

2.1 PM Amount Estimation Portion 32

The portion 32 estimates PM amount accumulated on the GPF (hereinafter also referred to as an "accumulated PM amount"). The accumulated PM amount is based on the PM amount collected in the GPF (hereinafter also referred to as a "collected PM amount") and the PM amount oxidized in the GPF (hereinafter also referred to as an "oxidized PM amount").

The collected PM amount is calculated by multiplying the PM amount discharged from the engine (hereinafter also referred to as a "discharged PM amount") by a predetermined collection rate. The discharged PM amount is calculated based on an operating condition of the engine. The oxidized PM amount is calculated, for example, by multiplying the current accumulated PM amount by the predetermined oxidation rate which is calculated based on bed temperature of the honeycomb structure and oxygen concentration in the upstream of the GPF. The accumulated PM amount is calculated, for example, by integrating for each cycle a difference between the collected PM amount and the oxidized PM amount. It should be noted that the calculation method described here is merely an example, and various known methods are applicable to estimation method for the accumulated PM amount.

2.2 OT Risk from the Misfire Set Portion 34

The portion 34 sets OT risk from the misfire. The OT risk from the misfire is used to detect an occurrence of misfire having a level at which exhaust purifying function of the catalyst is impaired (hereinafter also referred to as "OT-level misfire") as a result of excessive increase in bed temperature of the catalyst. The OT risk from the misfire is set based on basic OT risk from the misfire and a correction coefficient. The basic OT risk from the misfire is a basic value of the OT risk from the misfire which is set based on the operating condition of the engine. The OT risk from the misfire is set by multiplying the basic value by the correction coefficient.

Figure 2:
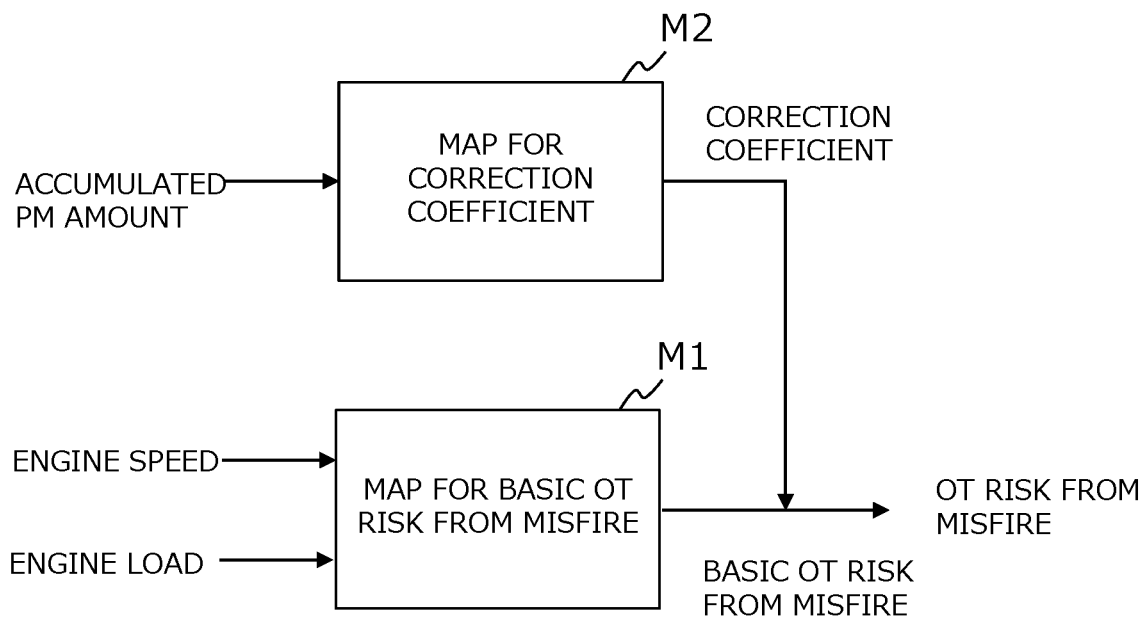
FIG. 2 is a block diagram for describing an example of setting processing of OT risk from the misfire.

FIG. 2 is a block diagram for describing an example of setting processing of the OT risk from the misfire executed by the portion 34. In the setting processing, the basic OT risk from the misfire is obtained by verification of a map for the basic OT risk from the misfire M1 (hereinafter simply referred to as a "map M1"). The map M1 is stored in the memory of the ECU 30. The map M1 defines a relationship between engine speed, engine load and the basic OT risk from the misfire.

Figure 3:
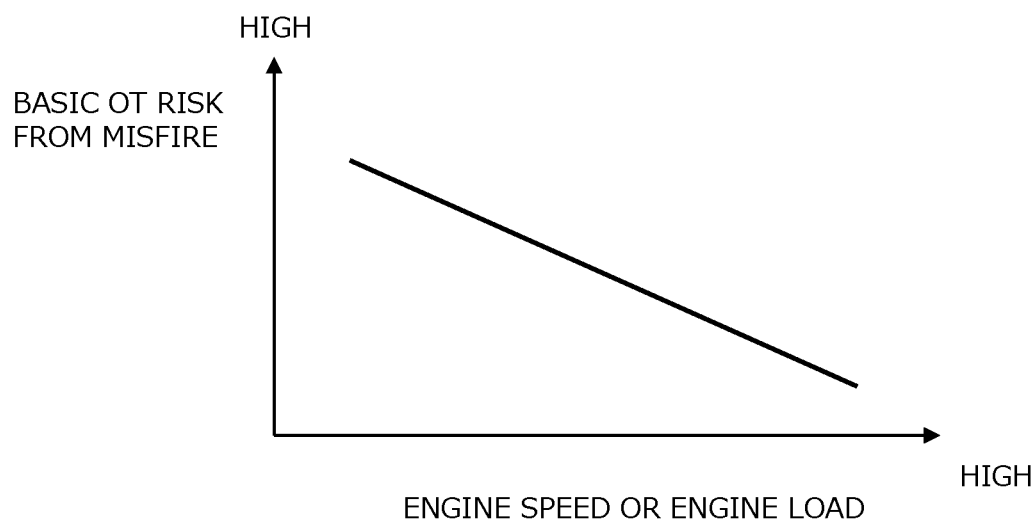
FIG. 3 is a diagram for showing an example of a relationship between engine speed (or engine load) and basic OT risk from the misfire.

FIG. 3 is a diagram for showing an example of the relationship between engine speed (or engine load) and the basic OT risk from the misfire. As shown in FIG. 3, the higher the engine speed (or the engine load) increases, the lower the basic OT risk from the misfire decreases. The reason for showing such the relationship is follows. That is, in the low-speed and low-load region, the occurrence of the misfire occurs has relatively less impact on the increase in bed temperature, whereas it has a much greater impact thereon in the high-speed and high-load region. Note that engine speed is obtained from the information on crank angle, and the engine load is obtained from the information on throttle position and crank angle.

In the setting processing, the correction coefficient is obtained by verification of a map for the correction coefficient M2 (hereinafter also simply referred to as a "map M2"). The verification processing is executed with the latest accumulated PM amount estimated by the portion 32. Like the map M1, the map M2 is stored in the memory of the ECU 30. The map M2 defines a relationship between the accumulated PM amount and the correction coefficient.

Figure 4:
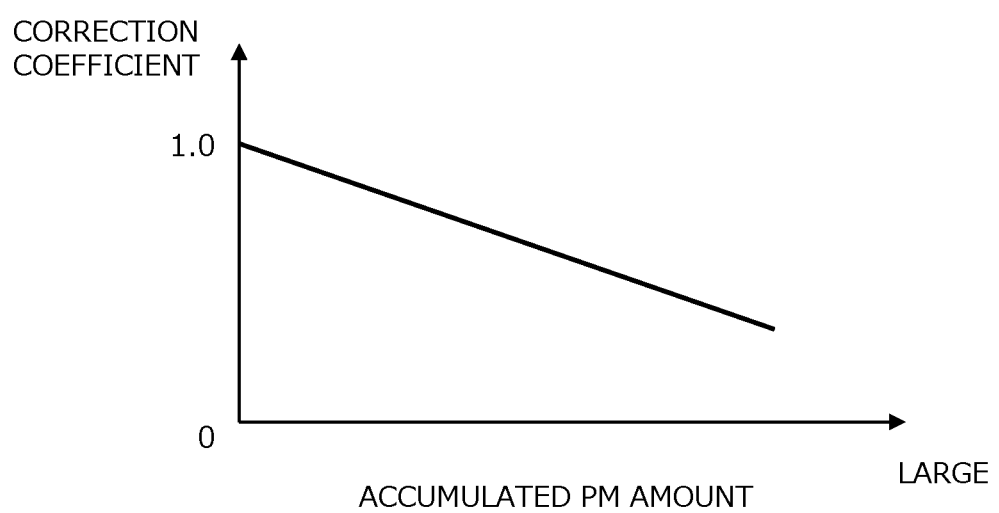
FIG. 4 is a diagram for showing an example of a relationship between an accumulated PM amount and a correction coefficient.

FIG. 4 is a diagram for showing an example of a relationship between the accumulated PM amount and the correction coefficient. As shown in FIG. 4, as the accumulated PM amount increases, the correction coefficient decreases. When the accumulated PM amount is zero, the correction coefficient is set to 1.0. That is, as the accumulated PM amount increases, the correction coefficient becomes smaller than 1.0. The reason for exhibiting such the relationship is that as the more the accumulated PM amount increases, the more the PM amount being burned at the occurrence of the misfire. This is because, as already described, that the combustion of the PM at the occurrence of the misfire is induced by the unburnt fuel which flows into the GPF.

2.3 OT-Level Misfire Judgment Portion 36

Figure 5:
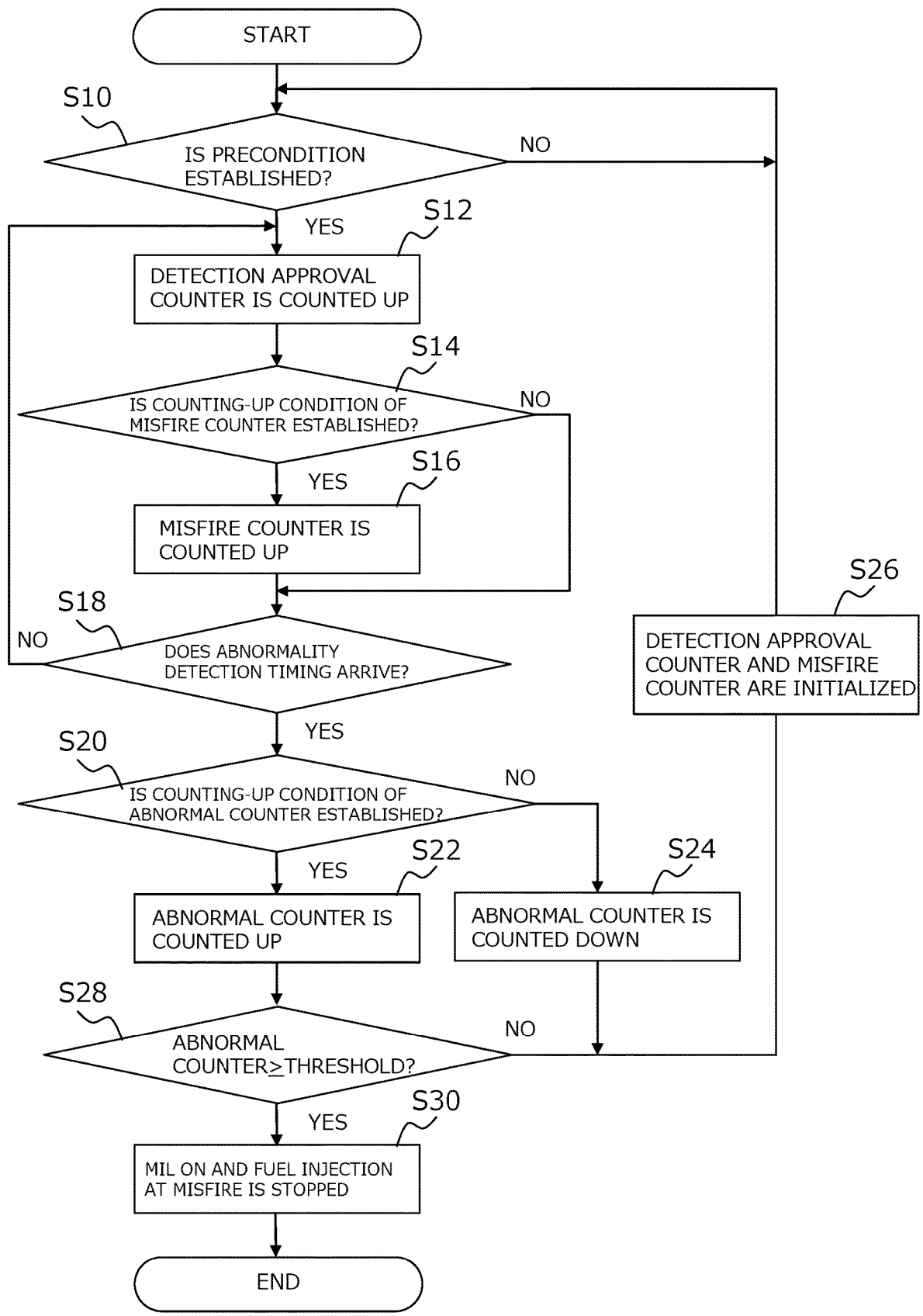
FIG. 5 is a flowchart for describing processing flow of the judgment processing of OT-level misfire.

The portion 36 judges the presence or absence of the OT-level misfire. FIG. 5 is a flowchart for describing processing flow of the judgment processing of the OT-level misfire executed by the portion 36. The routine shown in FIG. 5 is repeatedly executed while the engine is operated.

In the routine shown in FIG. 5, firstly, it is judged whether a precondition of the judgment processing is established or not (step S10). The precondition, for example, includes the following conditions.
(i) Engine warm-up has been completed
(ii) The engine is operated in idle state or steady state
(iii) The engine speed has not changed rapidly
(iv) No abnormality has occurred in various devices including a fuel injector and an ignition device The above condition (i) is judged, for example, based on coolant temperature of the engine. The above condition (ii) is judged, for example, based on the information on throttle position and speed of the vehicle. The above condition (iii) is judged, for example, based on the information on crank angle. The above condition (iv) is judged, for example, based on a signal generated in response to the occurrence of the abnormality in various devices.

The judgement processing of the step S10 is executed repeatedly until a positive judgment result is obtained. When the judgment result of step S10 is positive, detection approval counter is counted up (step S12). The detection approval counter has function to count engine combustion cycles. The counting up of the detection approval counter is executed by adding 1 to the previous counter value at each combustion cycle.

Subsequent to the step S12, it is judged whether or not a counting-up condition of a misfire counter is established (step S14). The counting-up condition of the misfire counter is established when rotation fluctuation value is greater than or equal to a threshold. The rotation fluctuation value is defined as a variation (e.g., standard deviation) in the time required for the crankshaft to rotate by a predetermined rotation angle (e.g., 30°). The rotation fluctuation value is obtained based on the information on crank angle.

When the judgment result of the step S14 is positive, the misfire counter is counted up (step S16). The misfire counter counts the number of times when the rotation fluctuation value is greater than or equal to the threshold. The counting up of the misfire counter is executed by adding 1 to the previous counter value every time when the judgment result of the step S14 is positive.

Subsequent to the step S16, it is judged whether or not abnormality detection timing arrives (step S18). The judgement processing of the step S18 is also executed when the judgment result of the step S14 is negative. The arrival of the abnormality detection timing is established when the detection approval counter is equal to or greater than a threshold (e.g., 200 times). If the judgment result of the step S18 is negative, the processing of the step S12 is executed and the detection approval counter is counted up.

When the judgment result of the step S18 is positive, it is judged whether or not a counting-up condition of an abnormal counter is established (step S20). The counting-up condition of the abnormal counter is established when actual risk from the misfire is equal to or greater than the OT risk from the misfire. The actual risk from the misfire is calculated by dividing the current value of the misfire counter by that of the detection approval counter. The OT risk from the misfire is that set by the portion 34.

When the judgment result of the step S20 is positive, the abnormal counter is counted up (step S22). The abnormal counter counts the number of times that actual risk from the misfire is equal to or greater than the OT risk from the misfire. The counting up of the abnormal counter is executed by adding 1 to the previous counter value every time when the judgment result of the step S20 is positive.

If the judgment result of the step S20 is negative, the abnormal counter is counted down (step S24). The count-down of the abnormal counter is executed by subtracting 1 from the previous counter value every time when the judgment result of the step S20 is negative.

Subsequent to the step S24, the detection approval counter and the misfire counter are initialized (step S26). That is, the counter values of the detection approval counter and the misfire counter are set to default value (i.e., zero). The initializing processing of the step S26 is also executed when the judgment result of step S28 (described later) is negative.

Subsequent to the step S22, it is determined whether or not the current value of the abnormal counter is equal to or greater than a threshold (e.g., three times) (step S28). In the series of processing from step S20 to S24, the abnormal counter is counted up or down in accordance with the judgment result of step S20. Therefore, the fact that the current value of the abnormal counter is equal to or larger than the threshold means that the abnormal counter has been continuously counted up by the number corresponding to the threshold.

When the judgment result of the step S28 is positive, the MIL 50 is turned on and fuel injection at a cylinder in which the misfire occurs is stopped (step S30). The lighting processing of the MIL 50 is executed based on an instruction for lighting. The injection stop processing is based on an instruction for injection stop to the injector 40 of the cylinder in which the misfire occurs. The injector 40 of the cylinder in which misfire occurs is identified based on history of counting-up of the misfire counter. For example, the cylinder that contributed most to the counting up of the misfire counter is identified as the cylinder of the misfire. Note that either one of the instructions for lighting and injection stop may be generated. That is, either one of the lighting processing and the injection stop processing may be executed.

3. Advantageous Effect

According to the embodiment described above, upon the detection of the occurrence of the OT-level misfire, the correction coefficient corresponding to the accumulated PM amount is multiplied by the basic OT risk from the misfire. The correction coefficient is set to a smaller value as the accumulated PM amount increases. Therefore, the OT risk from the misfire after the multiplication with the correction coefficient takes a smaller value as the accumulated PM amount increases. Therefore, it is possible to suppress false detection that the OT-level misfire has not occurred, despite the occurrence of the OT-level misfire caused by the combustion of the PM. In other words, it is possible to increase the accuracy in detecting the occurrence of the OT-level misfire caused by the combustion of the PM on the catalyst.

4. Correspondence Between the Embodiment Describe Above and the Present Disclosure The portion 32 corresponds to the "accumulated amount estimate portion" of the first aspect. The portion 34 corresponds to the "judgment value set portion" of the first aspect. The portion 36 corresponds to the "misfire judgment portion" of the first aspect. The OT risk from the misfire corresponds to the "misfire judgement value" of the first aspect. The basic OT risk from the misfire corresponds to the "basic misfire judgment value" of the second aspect.

5. Other Embodiments

The misfire detecting device according to the embodiment described above may be modified as follows.

Figure 6:
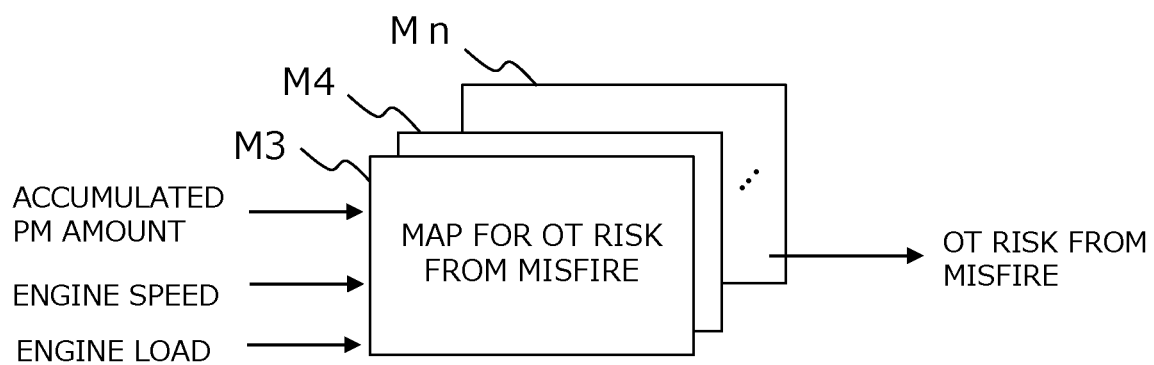
FIG. 6 is a block diagram for describing another example of the setting processing of the OT risk from the misfire.

FIG. 6 is a block diagram for describing another example of the setting processing of the OT risk from the misfire by the portion 34. In this setting processing, the OT risk from the misfire is directly obtained by verification of maps for the OT risk from the misfire M3, M4, . . . , Mn. These maps M3 to Mn are maps in which a relationship among engine speed, engine load and the basic OT risk from the misfire is set for each of the accumulated PM amount. Note that the engine speed is obtained from the information on crank angle, the engine load is obtained from the information on throttle position and crank angle, and the accumulated PM amount is estimated by the portion 32.

The internal combustion engine to which the misfire detecting device according to the embodiment described above is applied may be a compression ignition type engine. However, as an essential condition of this case, the compressed self-ignition type engine includes a filter for exhaust purification having the same function as the GPF (i.e., the PM collection function and the exhaust purifying function). When the compression ignition type engine includes such the filter, it is possible to detect the OT-level misfire by the misfire judgment processing described above.

What is claimed is:

1. A misfire detecting device of an internal combustion engine, comprising:
 a filter for exhaust purification of the internal combustion engine; and
 a control unit,
 wherein the control unit is configured to:
  estimate an amount of particulate matters accumulated on the filter;
  set a misfire judgement value based on an operating condition of the internal combustion engine and the accumulated amount of the particulate matters;
  when a predetermined judgement condition with the misfire judgement value is established, judge that a misfire occurs in the internal combustion engine; and
  when it is judged that the misfire occurs in the internal combustion engine, notify that an abnormality has occurred in the internal combustion engine,
 wherein the misfire judgement value being set when the accumulated amount of the particulate matters is a first amount, is a smaller value than the misfire judgement value being set when the accumulated amount of the particulate matters is a second amount, the first amount being greater than the second amount.

2. The misfire detecting device according to claim 1, wherein the control unit is further configured to:
 set a basic misfire judgment value based on the operating condition;
 set a correction coefficient based on the accumulated amount of the particulate matters; and
 set the misfire judgement value by multiplying the basic misfire judgment value by the correction coefficient,
 wherein the correction coefficient is set to a smaller value as the accumulated amount of the particulate matters increases.

3. The misfire detecting device according to claim 1, wherein the internal combustion engine is a spark ignition type engine equipped with an injector which is configured to inject fuel directly into a cylinder.

* * * * *